(12) United States Patent
Dwari et al.

(10) Patent No.: US 9,906,112 B2
(45) Date of Patent: Feb. 27, 2018

(54) ELECTROMAGNETIC PROPULSION SYSTEM HAVING A WIRELESS POWER TRANSFER SYSTEM

(71) Applicant: OTIS ELEVATOR COMPANY, Farmington, CT (US)

(72) Inventors: Suman Dwari, Vernon, CT (US); Parag M. Kshirsagar, South Windsor, CT (US); Arthur Hsu, South Glastonbury, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 0 days.

(21) Appl. No.: 15/245,870

(22) Filed: Aug. 24, 2016

(65) Prior Publication Data
US 2017/0057779 A1    Mar. 2, 2017

Related U.S. Application Data

(60) Provisional application No. 62/209,814, filed on Aug. 25, 2015.

(51) Int. Cl.
| | |
|---|---|
| *H02K 41/00* | (2006.01) |
| *H02K 41/03* | (2006.01) |
| *H02J 3/02* | (2006.01) |
| *B66B 1/30* | (2006.01) |
| *B66B 11/04* | (2006.01) |

(52) U.S. Cl.
CPC ............ *H02K 41/031* (2013.01); *B66B 1/30* (2013.01); *B66B 11/0407* (2013.01); *H02J 3/02* (2013.01)

(58) Field of Classification Search
USPC ........................................... 187/289
See application file for complete search history.

(56) References Cited

U.S. PATENT DOCUMENTS

| | | | | |
|---|---|---|---|---|
| 5,141,082 A * | 8/1992 | Ishii | ....................... | H02K 41/03 187/289 |
| 5,158,156 A * | 10/1992 | Okuma | ................... | H02K 41/03 187/250 |
| 7,261,186 B2 * | 8/2007 | Deplazes | ................ | B60L 13/10 187/277 |
| 7,478,706 B2 * | 1/2009 | Kocher | ............... | B66B 11/0407 187/276 |
| 7,839,101 B2 * | 11/2010 | Yu | ........................... | H02P 23/08 318/135 |
| 9,457,988 B1 * | 10/2016 | Anderson | ................ | B66B 5/16 |

(Continued)

*Primary Examiner* — Christopher Uhlir
(74) *Attorney, Agent, or Firm* — Cantor Colburn LLP

(57) ABSTRACT

An electromagnetic propulsion system includes a plurality of primary windings and a permanent magnet arranged to move with respect to the plurality of primary windings. A secondary winding of the system is disposed in a non-moving relationship with the permanent magnet. An excitation energy is applied to the plurality of primary windings for creating a magnetic field that includes a base component and low frequency harmonic components. The base component substantially contributes toward motion between the plurality of primary windings and the permanent magnet and the low frequency harmonic components substantially contributes toward generating an electro-motive force in the secondary winding based on displacement between the plurality of primary windings and the permanent magnet.

12 Claims, 7 Drawing Sheets

(56) References Cited

U.S. PATENT DOCUMENTS

2005/0087400 A1*  4/2005  Zhou .................. B66B 11/0407
                                              187/277
2011/0133564 A1*  6/2011  Teo ........................ H02J 17/00
                                              307/104

* cited by examiner

TOTAL EXCITATION CURRENTS

BASE FREQUENCY AND HIGH FREQUENCY CURRENTS

FIELD PRODUCED BY HIGH RIPPLES CURRENTS

ELECTROMAGNETIC PROPULSION SYSTEM HAVING A WIRELESS POWER TRANSFER SYSTEM

CROSS REFERENCE TO RELATED APPLICATION

This application claims priority to U.S. Provisional Application No. 62/209,814 filed Aug. 25, 2015, the entire contents of which is incorporated herein by reference.

BACKGROUND

The present disclosure relates to electromagnetic propulsion systems, and more particularly to propulsion systems having wireless power transfer systems.

Electromagnetic propulsion systems operate to move a first structure relative to a stationary second structure generally through magnetic levitation. Without tethers, it is difficult to provide on-board power to the moving first structure.

Self-propelled elevator systems, as one non-limiting example, may utilize such magnetic propulsion systems. Such ropeless elevator systems are useful in certain applications (e.g., high rise buildings) where the mass of the ropes for a roped system is prohibitive and/or there is a need for multiple elevator cars in a single hoistway. Elevator cars typically need power for ventilation, lighting systems, operation of doors and brakes, control units, communication units and to recharge batteries installed, for example, on an elevator car controller. Moreover, elevator cars may require back-up systems in case of a power failure. Existing systems use moving cables or current collectors/sliders to connect a moving elevator car with power lines distributed along the elevator hoistway.

SUMMARY

An electromagnetic propulsion system according to one, non-limiting, embodiment of the present disclosure includes a plurality of primary windings; a permanent magnet arranged to move with respect to the plurality of primary windings; a secondary winding disposed in a non-moving relationship with the permanent magnet; and an excitation energy applied to the plurality of primary windings for creating a magnetic field including a base component and low frequency harmonic components, and wherein the base component substantially contributes toward motion between the plurality of primary windings and the permanent magnet and the low frequency harmonic components contributes toward generating an electro-motive force in the secondary winding based on displacement between the plurality of primary windings and the permanent magnet.

Additionally to the foregoing embodiment, the magnetic field includes a high frequency component that contributes toward generating the electro-motive force in the secondary winding and based on variation with respect to time.

In the alternative or additionally thereto, in the foregoing embodiment, the permanent magnet and the secondary winding are carried by an elevator car which is propelled in response to the excitation energy.

In the alternative or additionally thereto, in the foregoing embodiment, the low frequency harmonics component and the high frequency component are used to transfer electrical power from the plurality of primary windings to the elevator car through the secondary winding.

In the alternative or additionally thereto, in the foregoing embodiment, the electromagnetic propulsion system is a linear electromagnetic motor.

In the alternative or additionally thereto, in the foregoing embodiment, the electromagnetic propulsion system is a compound motion electromagnetic motor.

An elevator system according to another, non-limiting, embodiment includes an elevator car arranged to move along a hoistway defined by a structure; an electrically powered subsystem carried by the elevator car; a plurality of primary windings engaged to the structure and positioned along the hoistway; a permanent magnet coupled to the elevator car, the plurality of primary windings and the permanent magnet configured to impart motion to the elevator car; an excitation energy applied to the plurality of primary windings for creating a magnetic field including a base component and a low frequency harmonics component, and wherein the base component substantially contributes toward the motion of the elevator car; and a secondary winding coupled to the elevator car and disposed adjacent to the permanent magnet, and wherein the low frequency harmonics component generates an electro-motive force in the secondary winding based on displacement between the plurality of windings and the elevator car for providing electrical power to the electrically powered subsystems.

Additionally to the foregoing embodiment, the magnetic field includes a high frequency component that contributes toward generating the electro-motive force in the secondary winding and based on variation with respect to time.

In the alternative or additionally thereto, in the foregoing embodiment, the electrically powered subsystem includes at least one of a battery, a ventilation unit, a lighting system, door operation unit, brake unit, display unit, a control unit, and a communication unit.

In the alternative or additionally thereto, in the foregoing embodiment, the elevator system includes a controller configured to sequentially control the energization of the plurality of primary windings.

In the alternative or additionally thereto, in the foregoing embodiment, the elevator system is ropeless.

In the alternative or additionally thereto, in the foregoing embodiment, the elevator system includes a power converter disposed in the elevator car and configured to convert an induced voltage and current from the secondary winding to suitable AC or DC voltage and current.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

The following patent applications assigned to the same assignee and filed on the same day as the present disclosure are herein incorporated by reference in their entirety.

Figure 1:
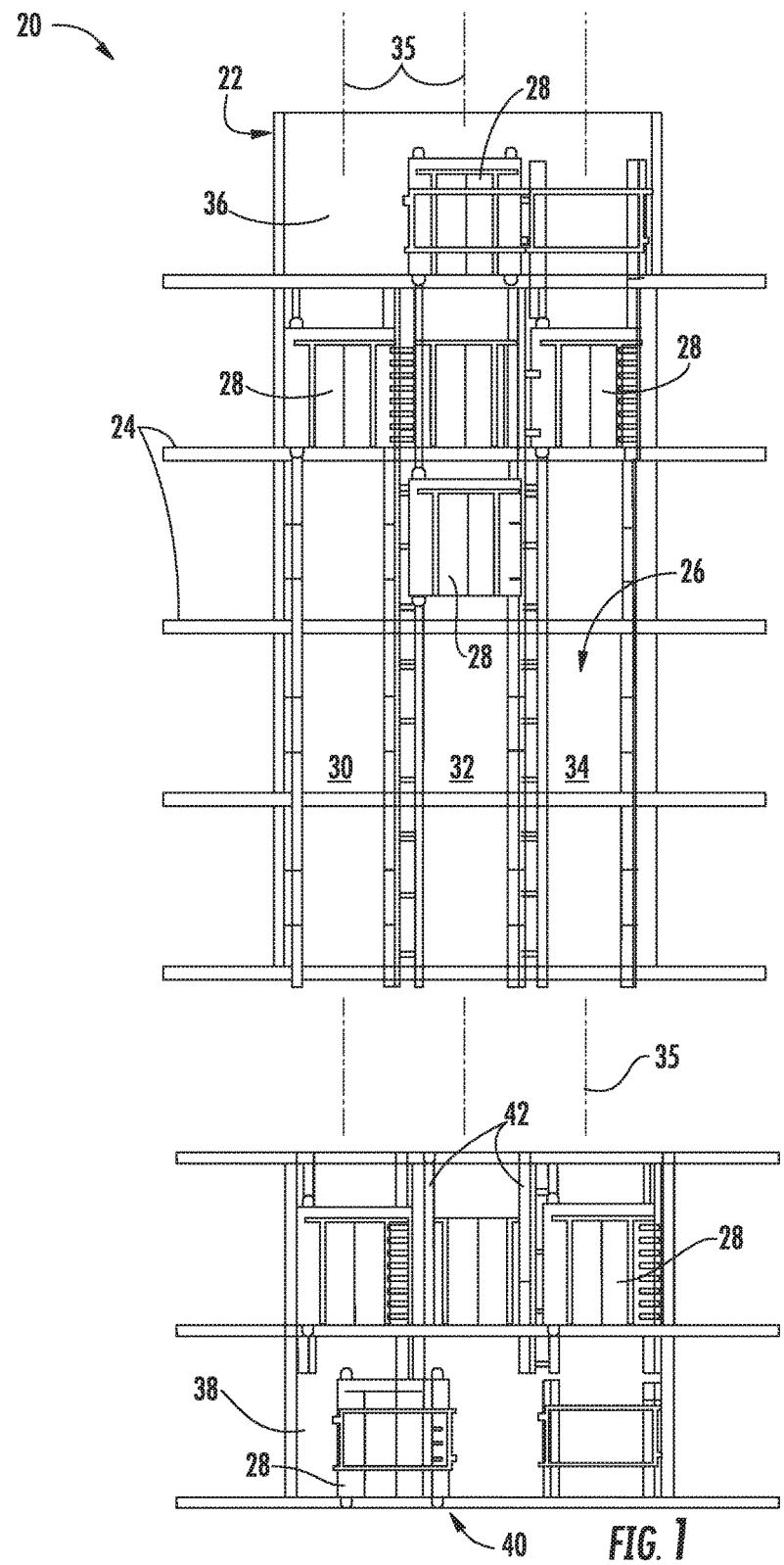
FIG. 1 depicts a multicar elevator system in an exemplary embodiment.

FIG. 1 depicts a self-propelled or ropeless elevator system 20 in an exemplary embodiment that may be used in a structure or building 22 having multiple levels or floors 24. Elevator system 20 includes a hoistway 26 having boundaries defined by the structure 22 and at least one car 28 adapted to travel in the hoistway 26. The hoistway 26 may include, for example, three lanes 30, 32, 34 each extending along a respective central axis 35 with any number of cars 28 traveling in any one lane and in any number of travel directions (e.g., up and down). For example and as illustrated, the cars 28 in lanes 30, 34, may travel in an up direction and the cars 28 in lane 32 may travel in a down direction.

Above the top floor 24 may be an upper transfer station 36 that facilitates horizontal motion to elevator cars 28 for moving the cars between lanes 30, 32, 34. Below the first floor 24 may be a lower transfer station 38 that facilitates horizontal motion to elevator cars 28 for moving the cars between lanes 30, 32, 34. It is understood that the upper and lower transfer stations 36, 38 may be respectively located at the top and first floors 24 rather than above and below the top and first floors, or may be located at any intermediate floor. Yet further, the elevator system 20 may include one or more intermediate transfer stations (not illustrated) located vertically between and similar to the upper and lower transfer stations 36, 38.

Figure 2:
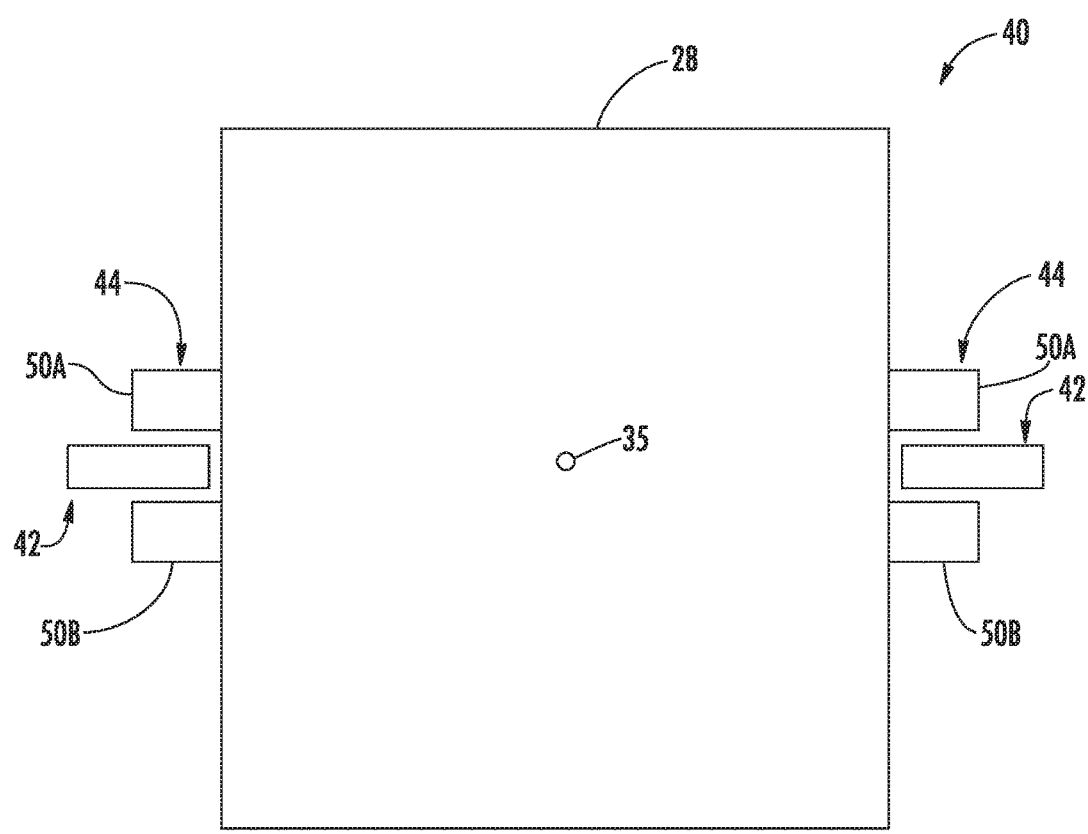
FIG. 2 is a top down view of a car and portions of a linear propulsion system in an exemplary embodiment.
Figure 3:
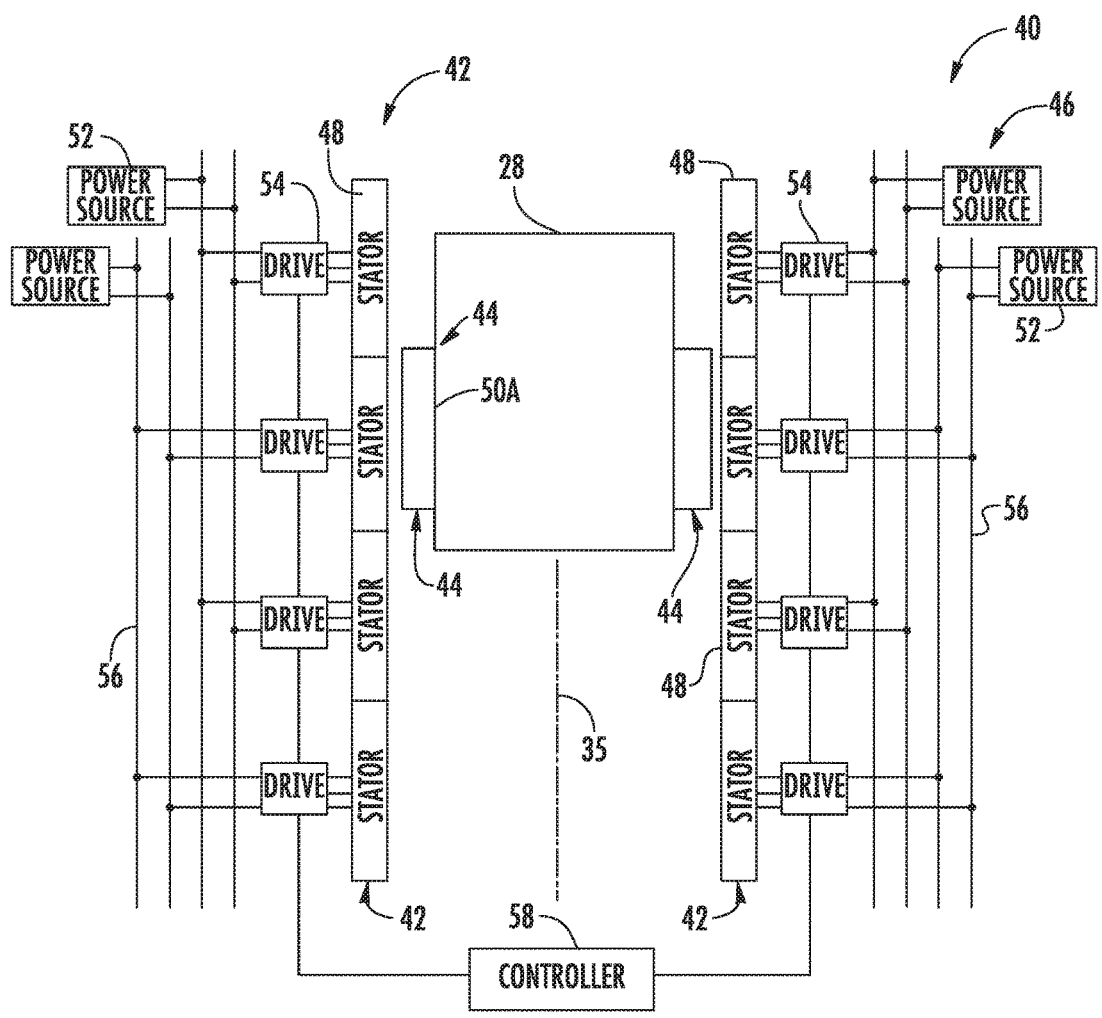
FIG. 3 is a schematic of the linear propulsion system.
Figure 4:
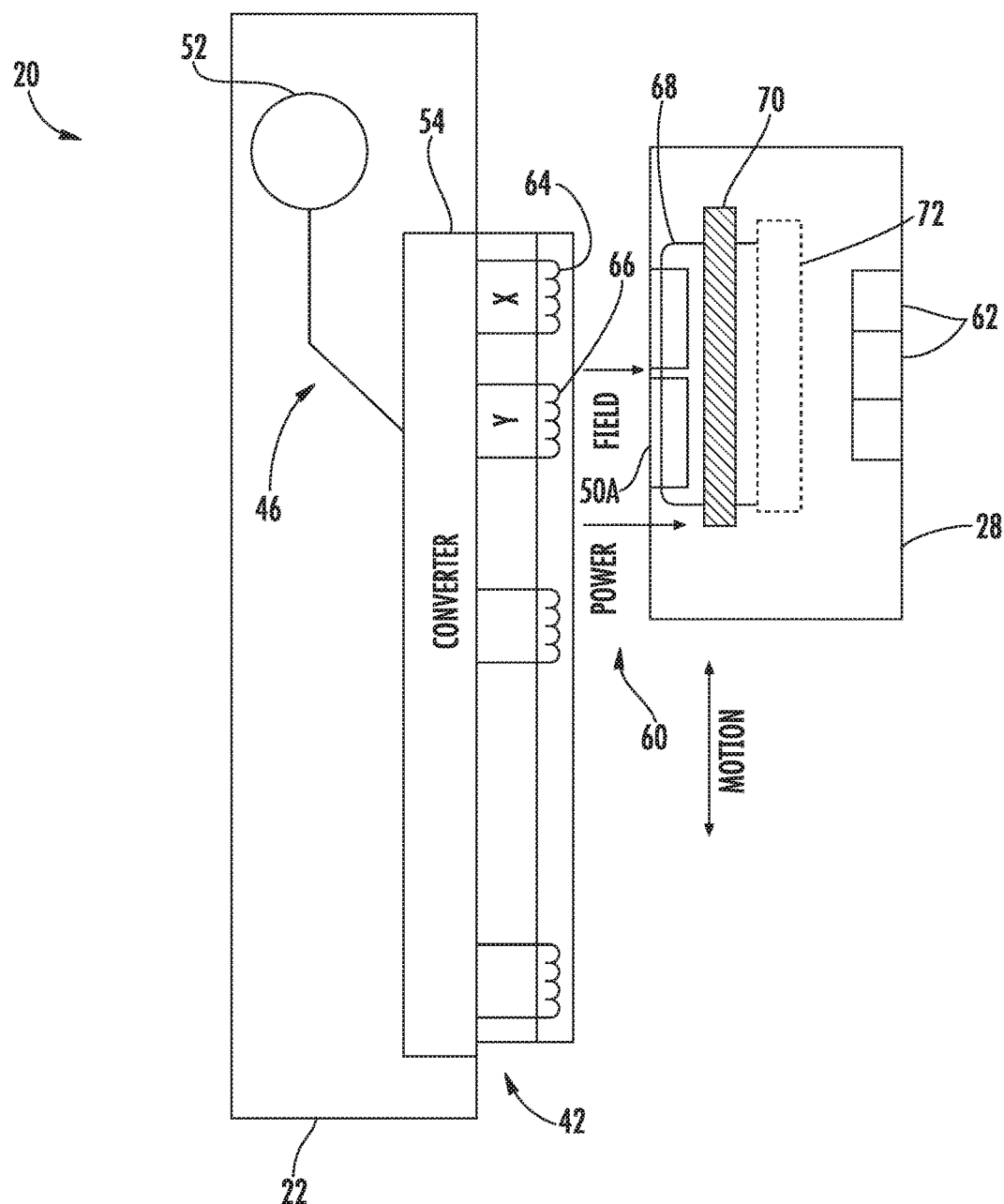
FIG. 4 is a schematic of the elevator system with a wireless power transfer system.

Referring to FIGS. 1 through 3, cars 28 are propelled using a linear propulsion system 40 having at least one, fixed, primary portion 42 (e.g., two illustrated in FIG. 2 mounted on opposite sides of the car 28), moving secondary portions 44 (e.g., two illustrated in FIG. 2 mounted on opposite sides of the car 28), and a control system 46 (see FIG. 4). The primary portion 42 (i.e. stator) includes a plurality of windings 48 mounted at one or both sides of the lanes 30, 32, 34 in the hoistway 26. Each secondary portion 44 may include two rows of opposing permanent magnets 50A, 50B mounted to the car 28. Primary portion 42 is supplied with drive excitations from the control system 46 to generate a magnetic flux that imparts a force on the secondary portions 44 to control movement of the cars 28 in their respective lanes 30, 32, 34 (e.g., moving up, down, or holding still). The plurality of windings 48 of the primary portion 42 are generally located between and spaced from the opposing rows of permanent magnets 50A, 50B. It is contemplated and understood that any number of secondary portions 44 may be mounted to the car 28, and any number of primary portions 42 may be associated with the secondary portions 44 in any number of configurations.

Referring to FIG. 3, the control system 46 may include power sources 52, power converters 54 (e.g. motor or propulsion drives), buses 56 and a controller 58. The power sources 52 are electrically coupled to the power converters 54 via the buses 56. In one non-limiting example, the power sources 52 may be direct current (DC) or alternating current (AC) power sources. DC power sources 52 may be implemented using storage devices (e.g., batteries, capacitors), and may be active devices that condition power from another source (e.g., rectifiers connected to power grid, generators, etc.). The power converters 54 may receive DC or AC power from the buses 56 and may provide drive excitations to the primary portions 42 of the linear propulsion system 40. Each power converter 54 may be a converter that converts DC or AC power from bus 56 to a multiphase (e.g., three phases illustrated in FIG. 3, and two phases illustrated in FIG. 4) drive excitation provided to a respective section of the primary portions 42. The primary portion 42 may be divided into a plurality of modules or sections, with each section associated with a respective power converter 54.

The controller 58 provides control signals to each of the power converters 54 to control generation of the drive excitation. Controller 58 may use pulse width modulation (PWM) control signals to control generation of the drive excitations by the power converters 54. Controller 58 may be implemented using a signal processor-based device programmed to generate the control signals. The controller 58 may be distributed as a part of each drive 54 to generate control signal for corresponding drive. The controller 58 may also be part of an elevator control system or elevator management system. Elements of the control system 46 may be implemented in a single, integrated module, and/or be distributed along the hoistway 26.

Referring to FIG. 4, a wireless power transfer system 60 of the elevator system 20 may be used to power loads or elevator car subsystems 62 in or on the elevator car 28. The power transfer system 60 may be an integral part of the control system 46 thereby sharing various components such as the controller 58 (see FIG. 3), buses 56, power source 52, power converters 54, primary portion(s) 42 and other components. The subsystems 62 may include batteries or energy storage devices, a ventilation unit, a lighting system, a door operation unit, brake unit, display unit, a control unit, a communication unit, and others. The subsystems 62 may be alternating current (AC) loads, such as fans of the ventilation unit and others, utilizing a traditional power frequency such as, for example, about 60 Hz. Alternatively, or in addition thereto, the subsystems 62 may include direct current (DC) loads, such as the display unit. The international patent application WO 2014/189492 published under the Patent Cooperation Treaty on Nov. 27, 2014, filed on May 21, 2013, and assigned to Otis Elevator Company of Farmington, Conn., is herein incorporated by reference in its entirety.

Figure 5:
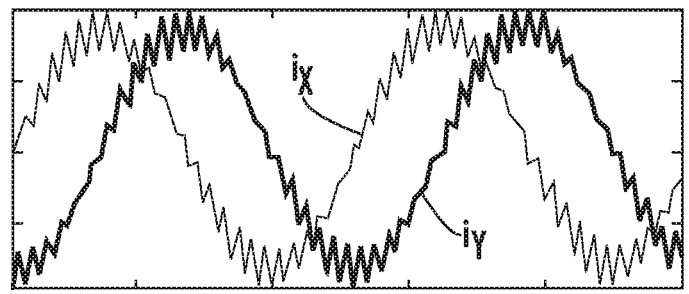
FIG. 5 is a graph of total excitation currents.

Referring to FIGS. 4 and 5, the primary assembly 42 may include a plurality of primary windings 64 at a first phase and a plurality of primary windings 66 at a second phase offset from the first phase. The power converter 54 (e.g. switching power converter controlled with PWM) receives power from the power supply 52 and may convert the power to a predetermined base frequency, voltage, number of phases (two illustrated in FIG. 4) and controlled excitation current of the primary windings 64, 66. The energy from the converter 54 is outputted to the primary windings 64, 66. The total excitation current received by each primary winding 64, 66 is illustrated in FIG. 5. The mechanical propulsion is produced by the low frequency (i.e., base frequency)

component of the excitation, which is generally at a low frequency that may be in a range of about 0 Hz to 100 Hz (i.e., wherein 0 Hz may be when the car is held at a stationary position by the excitation of the primary windings).

Figure 6:
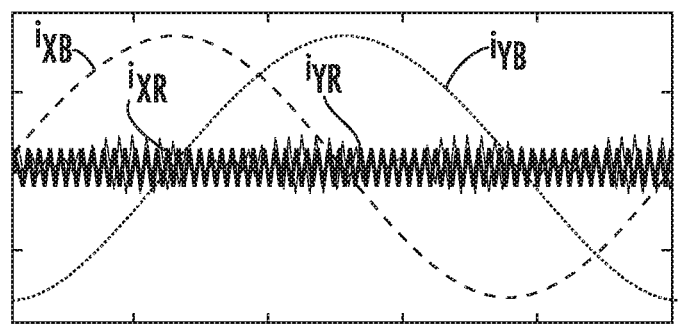
FIG. 6 is a graph of base frequency and high frequency components of the total excitation currents in FIG. 5.
Figure 7:
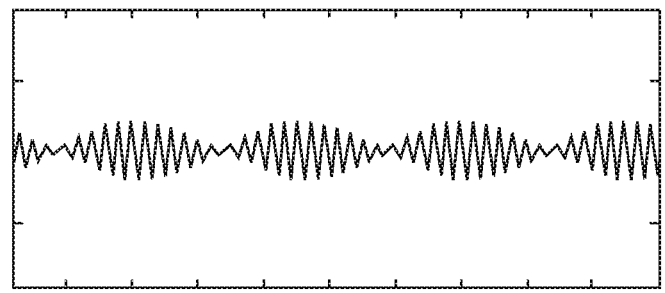
FIG. 7 is a graph of a field produced by the high frequency components.

Generally inherent in the switching power converter 54 is the modulation of switches that may produce switching frequency ripple. The switching frequency ripple components are utilized by the wireless power transfer system 60. More specifically and as best shown in FIG. 6, the total excitation current ($i_x$) of the winding 64 may be broken down into a base frequency component ($i_{xb}$) at the low base frequency and a ripple or switching frequency component ($i_{xs}$) at a much higher excitation switching frequency (i.e. switching frequency ripple) that may be in a range of about 1 kHz to 100 kHz. Similarly, the total excitation current ($i_y$) of the winding 66 may be broken down into a base frequency component ($i_{yb}$) at the low frequency and a switching frequency component ($i_{ys}$) at the much higher excitation switching frequency. The base frequency components ($i_{xb}$), ($i_{yb}$) of the respective total excitation currents ($i_x$), ($i_y$) may generally be used by the propulsion system 40 to levitate and/or propel the elevator car 28. The switching frequency components ($i_{xs}$), ($i_{ys}$) may be used by the wireless power transfer system 60 to power the elevator car loads 62. Referring to FIG. 7, a graph illustrates the probable resultant field produced by the switching frequency components ($i_{xs}$), ($i_{ys}$). Alternatively, or in addition to this excitation the primary winding can be supplied with a high frequency excitation, which is much greater than the base frequency but lower than the switching frequency, to transfer wireless power to the secondary.

The wireless power transfer system 60 may further include components generally in or carried by the elevator car 28. Such components may include a secondary winding 68 configured to be induced with a voltage or current when the energized primary windings 64, 66 are proximate thereto, a resonant component 70 that may be active and/or passive, and a power converter 72. The secondary winding 68 may induce a current when the winding is proximate to the energized primary windings 64, 66, and may be induction based, or resonance based constructed to resonate generally at the frequency of the excitation switching ripple or at the harmonic components of the switching frequency ripple. Although not illustrated, the secondary windings 68 may have a pole pitch that is not equal to a pole pitch of the primary windings 64, 66. The secondary windings 68 of the power transfer system 60 may generally wrap about one or both of the permanent magnets 50A, 50B of the secondary portion 44 of the propulsion system 40.

The resonant component 70 receives energy from the secondary winding 68 and may be passive or active. As a passive resonant component 70, the component is generally a capacitor and capable of storing or operating on AC power. As an active resonant component 70, the component 70 is configured to mitigate the effects of a weak or variable coupling factor (i.e., varies when the secondary winding 68 passes the primary windings 64, 66). That is, the resonant component 70 may function to level-out the induced output current and voltage from the secondary winding 68.

The power converter 72 in the elevator car 28 is configured to receive high frequency power from the resonant component 70. The converter 72 may reduce the high frequency power to a suitable low frequency power (e.g., low power frequency of 60 Hz or other) that is compatible with AC loads 62 in the elevator car 28. The converter 72 may further function to convert the high frequency power to DC power, which is then stored in an energy storage device (not illustrated). An example of an energy storage device may be a type of battery.

The ability to induce current in the secondary winding 68 at the high switching frequency (i.e., as oppose to low frequency) may optimize the efficiency of induced power transfer from the primary windings 64, 66 to the secondary winding 68. Moreover, the high switching frequency generally facilitates the reduction in size of many system components such as the secondary winding 68, the resonant component 70 and the converter 72 amongst others. Reducing the size of components improves packaging of the system and may reduce elevator car 28 weight.

The secondary winding 68 may be designed and deployed such that the base frequency components ($i_{xb}$), ($i_{yb}$) do not create any variable field upon the secondary winding, and only the high switching frequency field (i.e. produced by converter switching) produces a varying field across the secondary winding to enable wireless power transfer. The elevator system 20 is highly reliable, safe, and is not limited by the mechanical and electrical limitations of a contact based power transfer system. The elevator system 20 may utilize existing excitation arrangements on the stationary side for the wireless power transfer function. Moreover, the system 20 may utilize the ripple components produced by the switching of the power converter 54 which may already exist in typical systems. The system 20 is relatively simple and robust, and may not require additional switching or modulation of the primary excitation, and additional power converter and winding on the stationary side of the system. The present disclosure may also be utilized for any information exchange between the stationary and moving sides.

Figure 8:
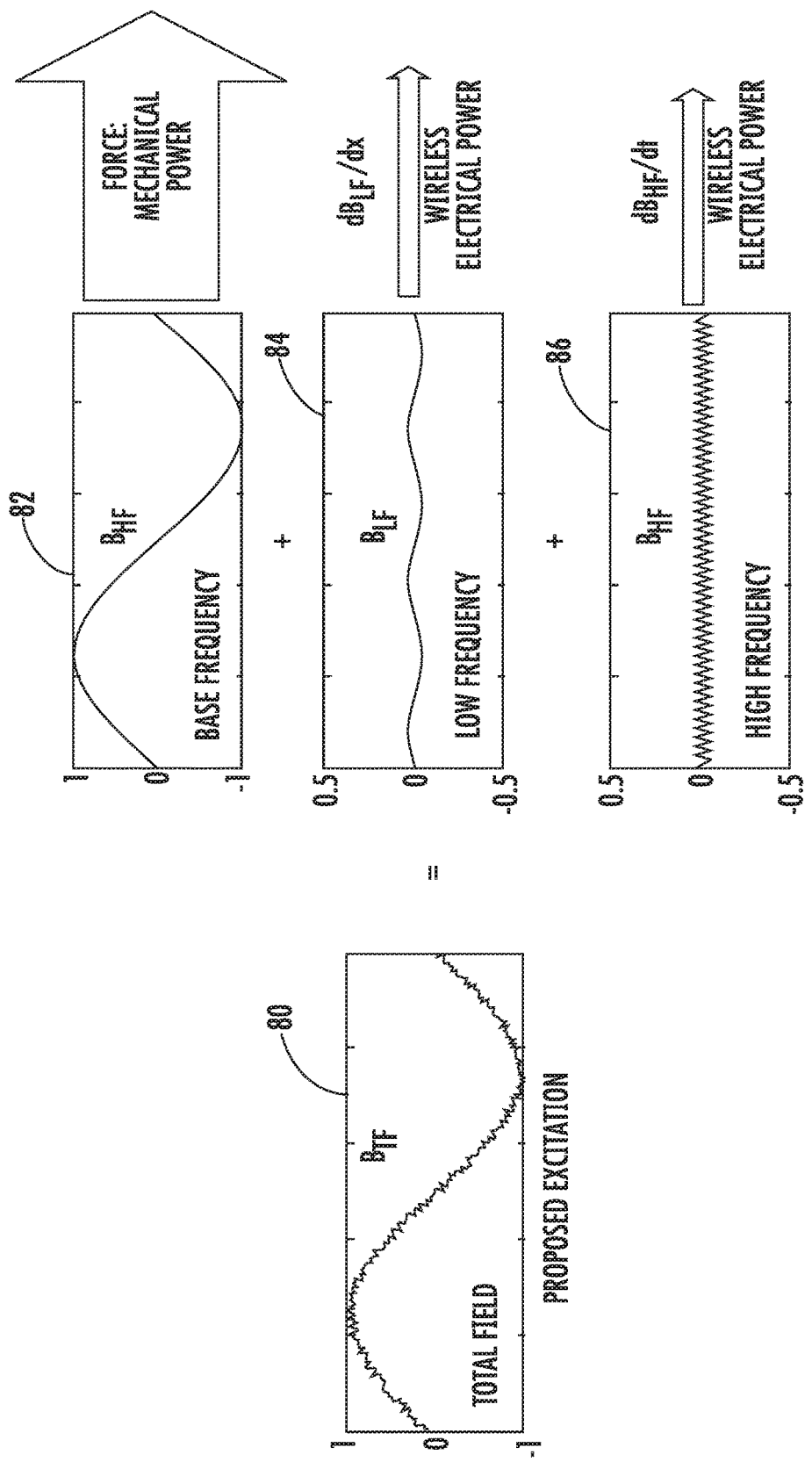
FIG. 8 is a block diagram illustrating magnetic field components produced by energized primary windings of the propulsion system.

Referring to FIG. 8, a method of utilizing the wireless power transfer system 60 applies the theory of induction of electro-motive force due to the change of magnetic flux with respect to space and time. As previously described electrical power may be transferred wirelessly from the primary windings 44, 46 to the secondary windings 68 by suitable excitation on the primary windings 44, 46. The total magnetic field ($B_{TF}$) 80 created by the energized primary windings may consist of three components: (1) a base component ($B_{BF}$) 82, (2) low frequency harmonic components ($B_{LF}$) 84, and (3) high frequency components ($B_{HF}$) 86. The components 82, 84, 86 are expressed in the following equation:

$$B_{TF}=B_{BF}+B_{LF}+B_{HF} \quad (1)$$

The base frequency harmonics component 82 interacts with the magnetic field of the permanent magnets 50A, 50B to create a force for propulsion. The low frequency harmonics component 84 creates an electro-motive mainly due to a change in position and may be expressed by the following equation:

$$e_{LF}=dB_{LF}/dx \quad (2)$$

The high frequency component 86 creates an electro-motive force mainly due to its variation with respect to time, and can be expressed by the following equation:

$$e_{HF}=dB_{HF}/dt \quad (3)$$

Therefore, the low frequency harmonics component 84 and the high frequency component 86, created by the primary windings 44, 46 may be utilized to transfer electrical power wireless to the elevator car 28. In addition to the dynamic condition, under static conditions when the elevator car 28 is stationary, wireless power transfer may be achieved by modifying the base flux (eq. 1) and by utilizing the high frequency component 86 (eq. 3). The low frequency harmonic components 84 may be produced by using the combination of winding structure and excitation currents. Power transfer using low frequency harmonic components 84 may produce pulsating forces for set of primary and secondary windings. Such pulsating forces can be effectively cancelled on the car by proper phase displacement between the low frequency components in various sets of primary secondary winding. It is further contemplated and understood that the wireless transfer methods may be applicable to any type of electromagnetic dynamic system with linear, rotary and/or compound motions.

Low frequency harmonic components 84 for wireless power transfer can be created by using the combination of winding structure and excitation currents. Power transfer using low frequency harmonic components 84 may produce pulsating forces for set of primary and secondary windings. Such pulsating forces can be effectively cancelled on the car 28 by proper phase displacement between the low frequency harmonic components 84 in various sets of primary secondary winding.

Figure 9:
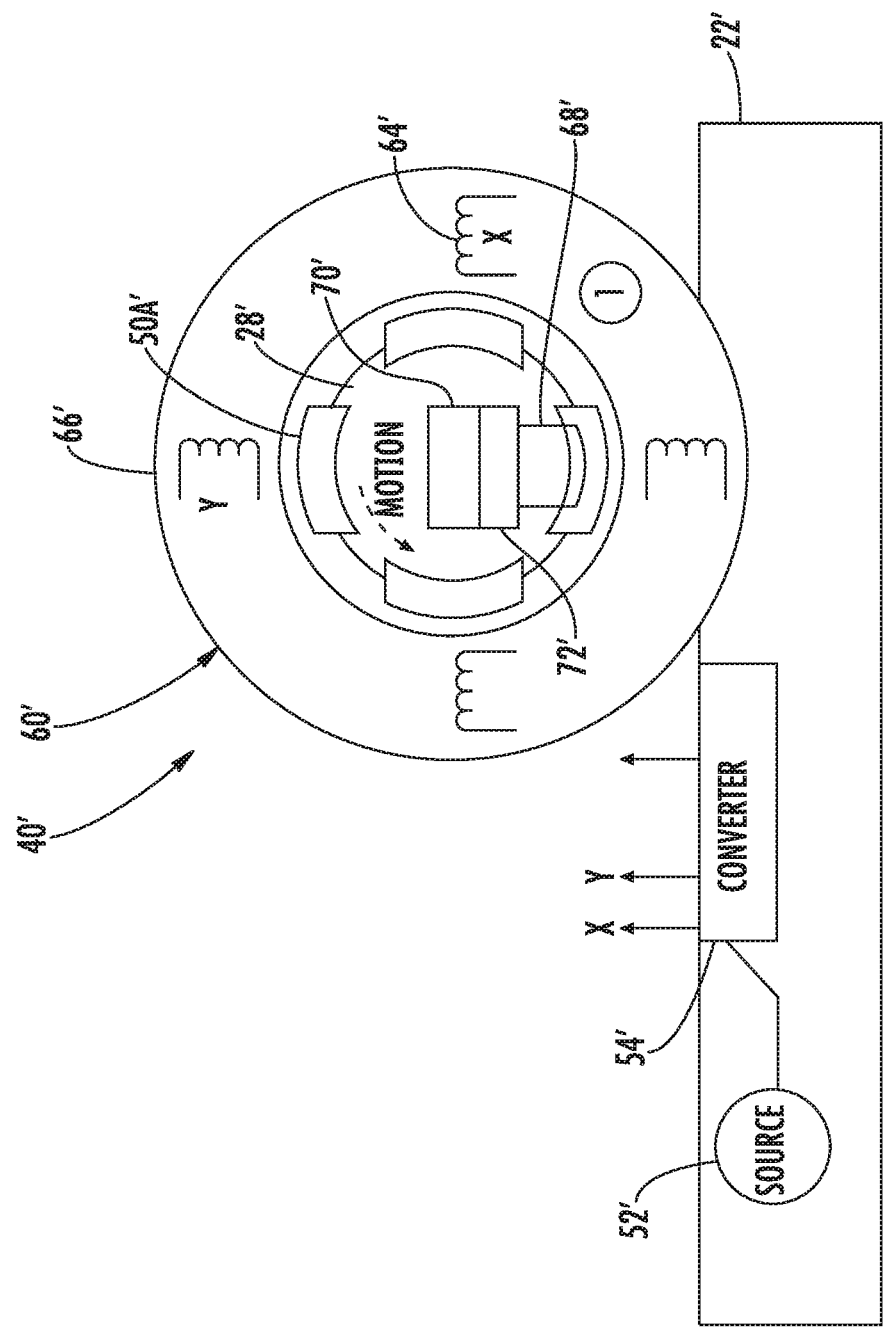
FIG. 9 is a schematic of a second embodiment of a propulsion system with a wireless power transfer system.

Referring to FIG. 9, a second embodiment of a propulsion system is illustrated wherein like components to the first embodiment have like element numbers except with the addition of a prime symbol suffix. A propulsion system 40' may not be linear and instead may be a compound motion electromechanical motor that may include rotation (i.e. rotating motor), or a combination of rotary and linear motion. A wireless power transfer system 60' may be integral to the propulsion system 40'. It is further contemplated and understood that the systems 40', 60' may not be limited to elevators and may be applied to any variety of applications that may require wireless power transfer to a moving structure 28' from a stationary structure 22'.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

The invention claimed is:

1. An electromagnetic propulsion system comprising:
a plurality of primary windings;
a permanent magnet arranged to move with respect to the plurality of primary windings;
a secondary winding disposed in a non-moving relationship with the permanent magnet; and
an excitation energy applied to the plurality of primary windings for creating a magnetic field including a base component and low frequency harmonic components, and wherein the base component substantially contributes toward motion between the plurality of primary windings and the permanent magnet and the low frequency harmonic components substantially contributes toward generating an electro-motive force in the secondary winding based on displacement between the plurality of primary windings and the permanent magnet.

2. The electromagnetic propulsion system set forth in claim 1, wherein the magnetic field includes a high frequency component that contributes toward generating the electro-motive force in the secondary winding and based on variation with respect to time.

3. The electromagnetic propulsion system set forth in claim 2, wherein the permanent magnet and the secondary winding are carried by an elevator car which is propelled in response to the excitation energy.

4. The electromagnetic propulsion system set forth in claim 3, wherein the low frequency harmonic components and the high frequency component are used to transfer electrical power from the plurality of primary windings to the elevator car through the secondary winding.

5. The electromagnetic propulsion system set forth in claim 1, wherein the electromagnetic propulsion system is a linear electromagnetic motor.

6. The electromagnetic propulsion system set forth in claim 1, wherein the electromagnetic propulsion system is a compound motion electromagnetic motor.

7. An elevator system comprising:
an elevator car arranged to move along a hoistway defined by a structure;
an electrically powered subsystem carried by the elevator car;
a plurality of primary windings engaged to the structure and positioned along the hoistway;
a permanent magnet coupled to the elevator car, the plurality of primary windings and the permanent magnet configured to impart motion to the elevator car;
an excitation energy applied to the plurality of primary windings for creating a magnetic field including a base component and low frequency harmonic components, and wherein the base component substantially contributes toward the motion of the elevator car; and
a secondary winding coupled to the elevator car and disposed adjacent to the permanent magnet, and wherein the low frequency harmonic components generates an electro-motive force in the secondary winding based on displacement between the plurality of primary windings and the elevator car for providing electrical power to the electrically powered subsystem.

8. The elevator system set forth in claim 7, wherein the magnetic field includes a high frequency component that contributes toward generating the electro-motive force in the secondary winding and based on variation with respect to time.

9. The elevator system set forth in claim 7, wherein the electrically powered subsystem includes at least one of a battery, a ventilation unit, a lighting system, door operation unit, brake unit, display unit, a control unit, and a communication unit.

10. The elevator system set forth in claim 7 further comprising:
a controller configured to sequentially control the energization of the plurality of primary windings.

11. The elevator system set forth in claim 7, wherein the elevator system is ropeless.

12. The elevator system set forth in claim 7 further comprising:
a power converter disposed in the elevator car and configured to convert an induced voltage and current from the secondary winding to suitable AC or DC voltage and current.

* * * * *